United States Patent
Caprera

(10) Patent No.: US 8,424,567 B2
(45) Date of Patent: Apr. 23, 2013

(54) BI-DIRECTIONAL VALVE WITH CAVITY PRESSURE RELIEF

(75) Inventor: Brian Caprera, Warwick, RI (US)

(73) Assignee: Cameron International Corporation, Houston, TX (US)

( * ) Notice: Subject to any disclaimer, the term of this patent is extended or adjusted under 35 U.S.C. 154(b) by 533 days.

(21) Appl. No.: 12/641,388

(22) Filed: Dec. 18, 2009

(65) Prior Publication Data

US 2011/0146808 A1    Jun. 23, 2011

(51) Int. Cl.
   *E03B 1/00*   (2006.01)

(52) U.S. Cl.
   USPC ............ 137/599.18; 137/601.21; 251/315.16

(58) Field of Classification Search ............ 137/599.18, 137/601.2, 601.21, 614.17, 312; 251/117, 251/315.01, 315.16
   See application file for complete search history.

(56) References Cited

U.S. PATENT DOCUMENTS

| | | | | |
|---|---|---|---|---|
| 1,185,333 A | * | 5/1916 | Keltner | 137/269.5 |
| 2,351,775 A | * | 6/1944 | McMurry | 137/599.18 |
| 3,101,740 A | * | 8/1963 | Ray | 137/596 |
| 3,647,178 A | * | 3/1972 | Adams | 251/148 |
| 6,065,736 A | | 5/2000 | Hunt | |
| 2004/0244851 A1 | | 12/2004 | Joseph, III | |
| 2005/0254961 A1 | | 11/2005 | Kawamura et al. | |
| 2005/0269544 A1 | * | 12/2005 | Oh | 251/315.01 |
| 2007/0284008 A1 | | 12/2007 | Brower et al. | |

OTHER PUBLICATIONS

PCT/US2010/058160 International Search Report and Written Opinion, Aug. 11, 2011 (9 p.).

* cited by examiner

*Primary Examiner* — Stephen M Hepperle
*Assistant Examiner* — Kevin E Lynn
(74) *Attorney, Agent, or Firm* — Chamberlain Hrdlicka

(57) ABSTRACT

A valve operable to control flow between two adjacent pipe sections and having a system for relieving pressure from an enclosed cavity within the valve. The valve includes a first pressure port, a second pressure port, and a seal. When the valve is closed, the first pressure port is in fluid communication with one pipe section and the second pressure port in fluid communication with the enclosed cavity. The seal isolates the second pressure port from the first pressure port when fluid pressure within the enclosed cavity is less than a pre-selected valve and is displaceable to enable fluid communication between the second pressure port and the first pressure port when fluid pressure in the enclosed cavity is equal to or greater than the pre-selected value.

18 Claims, 10 Drawing Sheets

US 8,424,567 B2

BI-DIRECTIONAL VALVE WITH CAVITY PRESSURE RELIEF

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The disclosure relates generally to valves having means for relief of internal cavity pressure. More particular, the disclosure relates to a bi-directional valve having means for cavity pressure relief integral to its body.

Ball valves are used extensively to control fluid flow through piping systems because they are reliable and can withstand high pressures and temperatures. Each ball valve typically has a body with a passage extending therethrough. The valve is coupled between adjacent sections of a piping system such that the through passage is aligned with the flowbores of the pipe sections. The valve further includes a ball disposed within the through passage. The ball has a bore extending therethrough and is rotatable relative to the valve body. When the ball is rotated to align the ball bore with the body through passage, the valve is open, and fluid in the upstream pipe section may pass through the valve to the downstream pipe section. When the ball is rotated such that the ball bore and the body through passage are perpendicular to one another, the valve is closed, and fluid is prevented from passing through the valve.

When the valve is actuated to move from the open position to the closed position, the ball bore forms an enclosed cavity with fluid entrapped therein. In the event that the temperature surrounding the valve increases, the temperature of fluid within the valve cavity also increases. This, in turn, causes the pressure of that fluid to increase, sometimes to a level beyond the valve pressure rating. Excessive fluid pressure within the valve can result in damage to and/or failure of the valve.

To alleviate this potential problem, the valve may further include means for venting pressure buildup within the valve cavity. For instance, many ball valves include self-relieving seats, which displace and/or deform to create a leak path when pressure within the cavity exceeds a certain level. In practice, however, the level at which the seats relieve may vary from one valve to the next. Consequently, the pressure relieving ability of these valves is inconsistent and unreliable. Moreover, the seats are subject to fatigue damage due to repeated venting and temperature changes. When damaged, the seats may allow leakage through the valve.

Other ball valves may include an add-on device, such as a spring-loaded piston, external to the valve body with a pressure relief tap extending from the device through the valve body to the cavity. When the cavity pressure is sufficient to overcome the spring force, the piston displaces, and the cavity pressure is relieved. Over time, the pressure relief tap can become a leakage path from the valve to the atmosphere.

Embodiments of the present invention are directed to valves with means for cavity pressure relief that seek to overcome these and other limitations of the prior art.

SUMMARY OF THE DISCLOSURE

A valve having a cavity pressure relief system is disclosed. In some embodiments, the valve is coupled between a first pipe section and a second pipe section and actuatable between an open configuration, wherein fluid flow is enabled between the first and second pipe sections, and a closed configuration, wherein fluid flow between the first and second pipe sections is prevented and fluid is entrapped within an enclosed cavity inside the valve. The valve includes a first pressure port in fluid communication with the first pipe section when the valve is closed, a second pressure port in fluid communication with the enclosed cavity when the valve is closed, and a first seal isolating the second pressure port from the first pressure port when fluid pressure within the enclosed cavity is less than a pre-selected value and displaceable to enable fluid communication between the second pressure port and the first pressure port when fluid pressure in the enclosed cavity is equal to or greater than the pre-selected value.

In some embodiments, the valve has a body having a through passage and a ball disposed within the through passage and having a bore, the ball rotatable between an open position, wherein the bore aligns with the through passage, and a closed position, wherein the bore is substantially normal to the through passage and forms an enclosed cavity. The valve further includes a first pressure port extending through the ball, the first pressure port in fluid communication with the first pipe section when the ball is in the closed position, a second pressure port extending through the valve, the second pressure port in fluid communication with the enclosed cavity when the ball is in the closed position, and a first seal disposed between the first pressure port and the second pressure port, the first seal isolating the second pressure port from the first pressure port when fluid pressure within the enclosed cavity is less than a pre-selected value and displaceable to enable fluid communication between the second pressure port and the first pressure port when fluid pressure in the enclosed cavity is equal or greater than the pre-selected value.

In some embodiments, the valve system includes a valve and a cavity pressure relief system coupled to the valve. The valve has a valve body having a through passage and a ball disposed within the through passage and having a bore, the ball is rotatable between an open position, wherein the bore aligns with the through passage, and a closed position, wherein the bore is substantially normal to the through passage and is enclosed. The cavity pressure relief system includes a first pressure port in fluid communication with the first pipe section when the ball is in the closed position and a second pressure port in fluid communication with the enclosed bore when the ball is in the closed position. The system also includes a first seal isolating the second pressure port from the first pressure port when fluid pressure within the enclosed bore is less than a pre-selected valve. The first seal is displaceable to enable fluid communication between the second pressure port and the first pressure port when fluid pressure in the enclosed bore is equal or greater than the pre-selected value. The system also includes a third pressure port in fluid communication with the second pipe section when the ball is in the closed position and a second seal isolating the third pressure port from the first pressure port.

Thus, embodiments described herein comprise a combination of features and characteristics intended to address various shortcomings associated with certain prior devices. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

For a detailed description of the disclosed embodiments, reference will now be made to the accompanying drawings in which.

DETAILED DESCRIPTION OF THE DISCLOSED EMBODIMENTS

Figure 1:
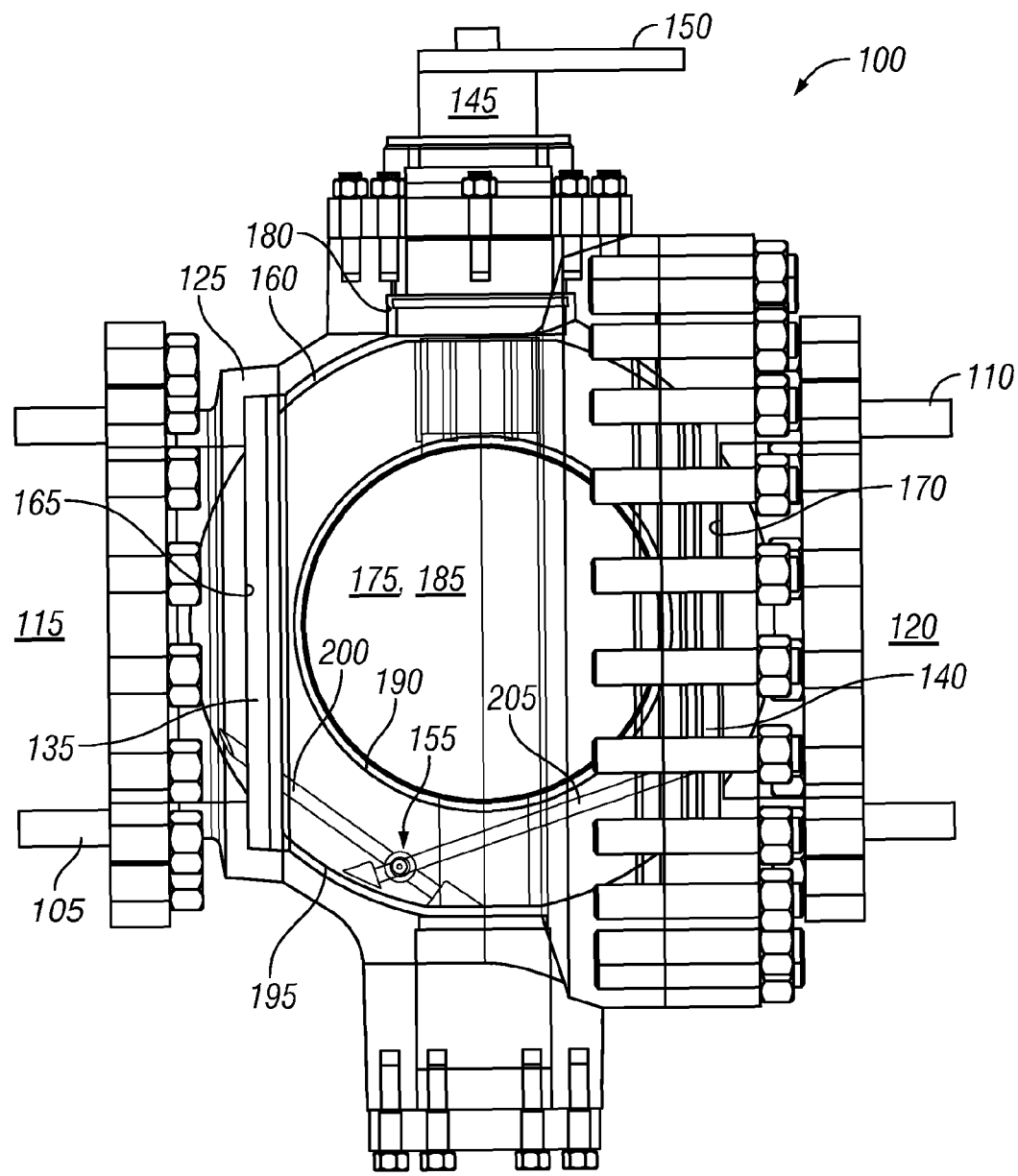
FIG. 1 is side view of an embodiment of bi-directional valve having an integral cavity pressure relief system in accordance with the principles disclosed herein.

The following description is directed to exemplary embodiments of a valve having means for cavity pressure relief. The embodiments disclosed should not be interpreted, or otherwise used, as limiting the scope of the disclosure, including the claims. One skilled in the art will understand that the following description has broad application, and that the discussion is meant only to be exemplary of the described embodiment, and not intended to suggest that the scope of the disclosure, including the claims, is limited to that embodiment.

Certain terms are used throughout the following description and the claims to refer to particular features or components. As one skilled in the art will appreciate, different persons may refer to the same feature or component by different names. This document does not intend to distinguish between components or features that differ in name but not function. Moreover, the drawing figures are not necessarily to scale. Certain features and components described herein may be shown exaggerated in scale or in somewhat schematic form, and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections. Further, the terms "axial" and "axially" generally mean along or parallel to a central or longitudinal axis, while the terms "radial" and "radially" generally mean perpendicular to the central or longitudinal axis.

Referring now to FIG. 1, there is shown a ball valve 100 coupled between two adjacent pipe sections 105, 110. Ball valve 100 is actuatable to enable and to prevent fluid flow between pipe sections 105, 110. In the following description, fluid is assumed to flow from a flowbore 115 of pipe section 105 through valve 100, when open, into a flowbore 120 of pipe section 110. Thus, pipe section 105 is upstream of valve 100, and pipe section 110 is downstream of valve 100. Alternatively, fluid may flow through valve 100 in the opposite direction. In such conditions, section 105 becomes the downstream pipe section and section 110 becomes the upstream pipe section. Because fluid may pass through valve 100 in either direction, valve 100 is bi-directional.

Valve 100 includes a body 125, a ball 130, an upstream seat 135, a downstream seat 140, a stem 145, a lever 150, and a cavity pressure relief system 155. Body 125 has a through passage 160 extending between two axially aligned ports 165, 170. Ball 130 is disposed within through passage 160 and rotatable relative to body 125. Ball 130 has a bore 175 extending therethrough. Upstream seat 135 is concentrically disposed about upstream port 165 between body 125 and ball 130. Similarly, downstream seat 140 is concentrically disposed about downstream port 170 between body 125 and ball 130. Each of upstream and downstream seats 135, 140 sealingly engages both body 125 and ball 130 to prevent fluid flow between body 125 and ball 130 at its respective interfaces.

Body 125 further includes a through bore 180. Stem 145 extends through bore 180 and is coupled between lever 150 and ball 130. Stem 145 enables the transfer of rotary motion from lever 150 to ball 130. Thus, when lever 150 is rotated, ball 130 is also rotated. Moreover, when lever 150 is rotated to align bore 175 of ball 130 with through passage 160 of body 125, valve 100 is open. As such, fluid may pass from flowbore 115 of upstream pipe section 105 through upstream port 165, valve 100, and downstream port 170 into flowbore 120 of downstream pipe section 110. When lever 150 is rotated such that bore 175 and through passage 160 are substantially perpendicular to each other, valve 100 is closed, as shown in FIG. 1. As such, fluid may not pass into valve 100 from either port 165, 170. When closed, bore 175 of ball 130 is isolated from flowbores 105, 110, meaning bore 175 is not in fluid communication with flowbores 105, 110. Isolated bore 175 forms an enclosed cavity 185 containing fluid. As described, ball 130 is actuatable to permit or prevent fluid flow through body 125. Consequently, ball 130 may be referred to as a closure member.

Cavity relief system 155 is operable to relieve pressure that may build up within cavity 185. Cavity relief system 155 is integral to ball 130, or disposed within the wall 192 of ball 130 between an inner surface 190 of ball 130 bounding bore 175 and an outer surface 195 of ball 130. System 155 includes an upstream pressure port 200 and a downstream pressure port 205. When valve 100 is closed, as shown, upstream pressure port 200 and downstream pressure port 205 are in fluid communication with the flowbores 115, 120 of upstream pipe section 105 and downstream pipe section 110, respectively. Because fluid flows from upstream pipe section 105 through valve 100, when open, to downstream pipe section 110, upstream pressure port 200 contains higher pressure fluid from upstream pipe section 105, in contrast to the lower pressure fluid of downstream pipe section 110, comparatively speaking, when valve 100 is closed. In such conditions, upstream pressure port 200 may be described as pressurized, while downstream pressure port 205 is not.

Figure 2A:
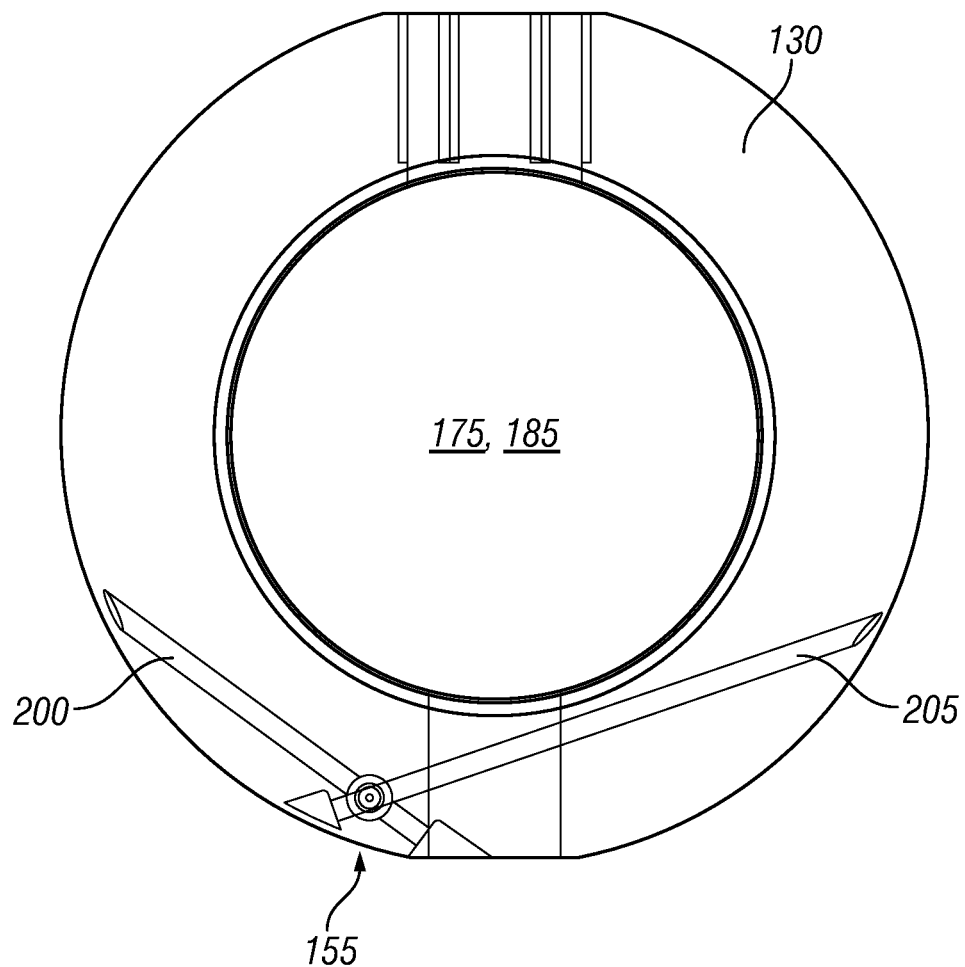
FIGS. 2A and 2B are end and perspective views, respectively, of the valve body of FIG. 1.
Figure 2B:
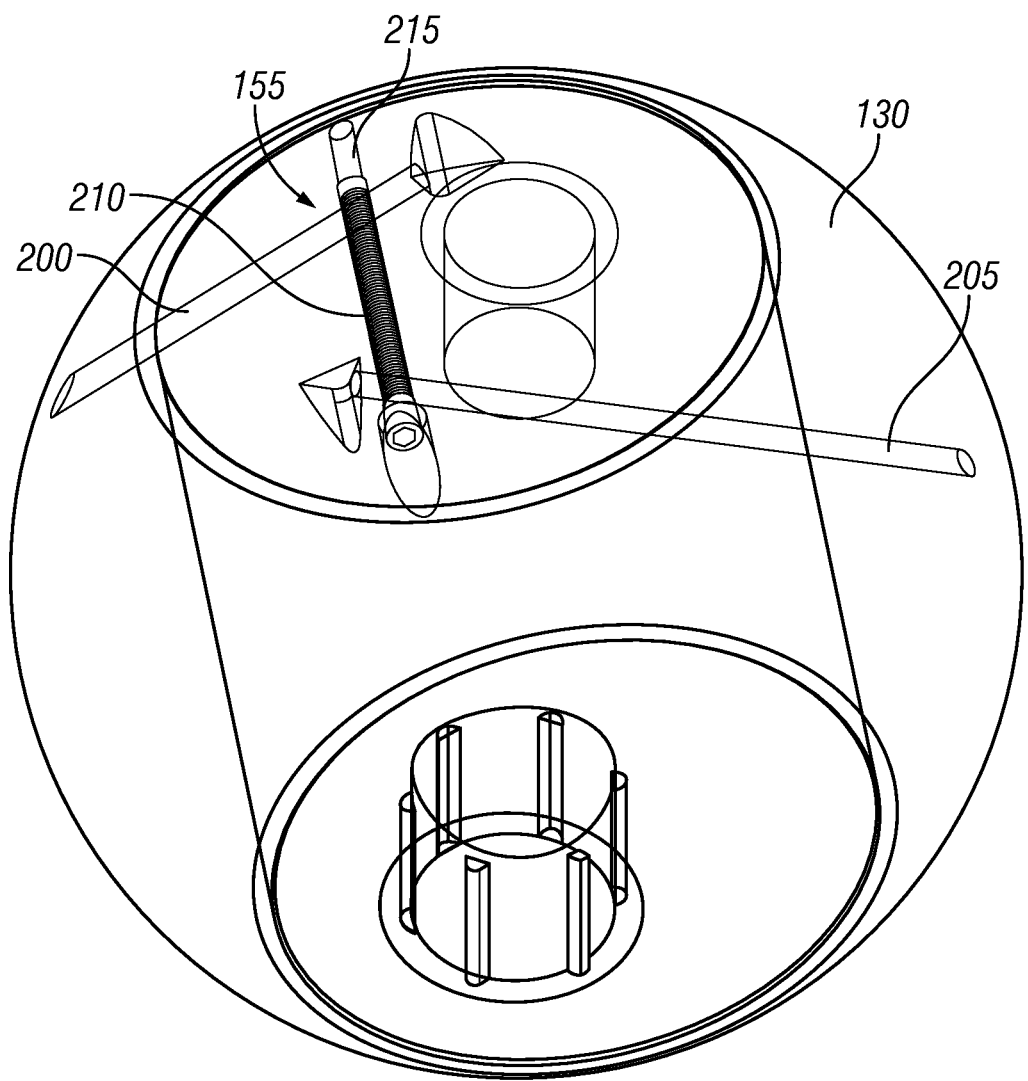
Figure 3:
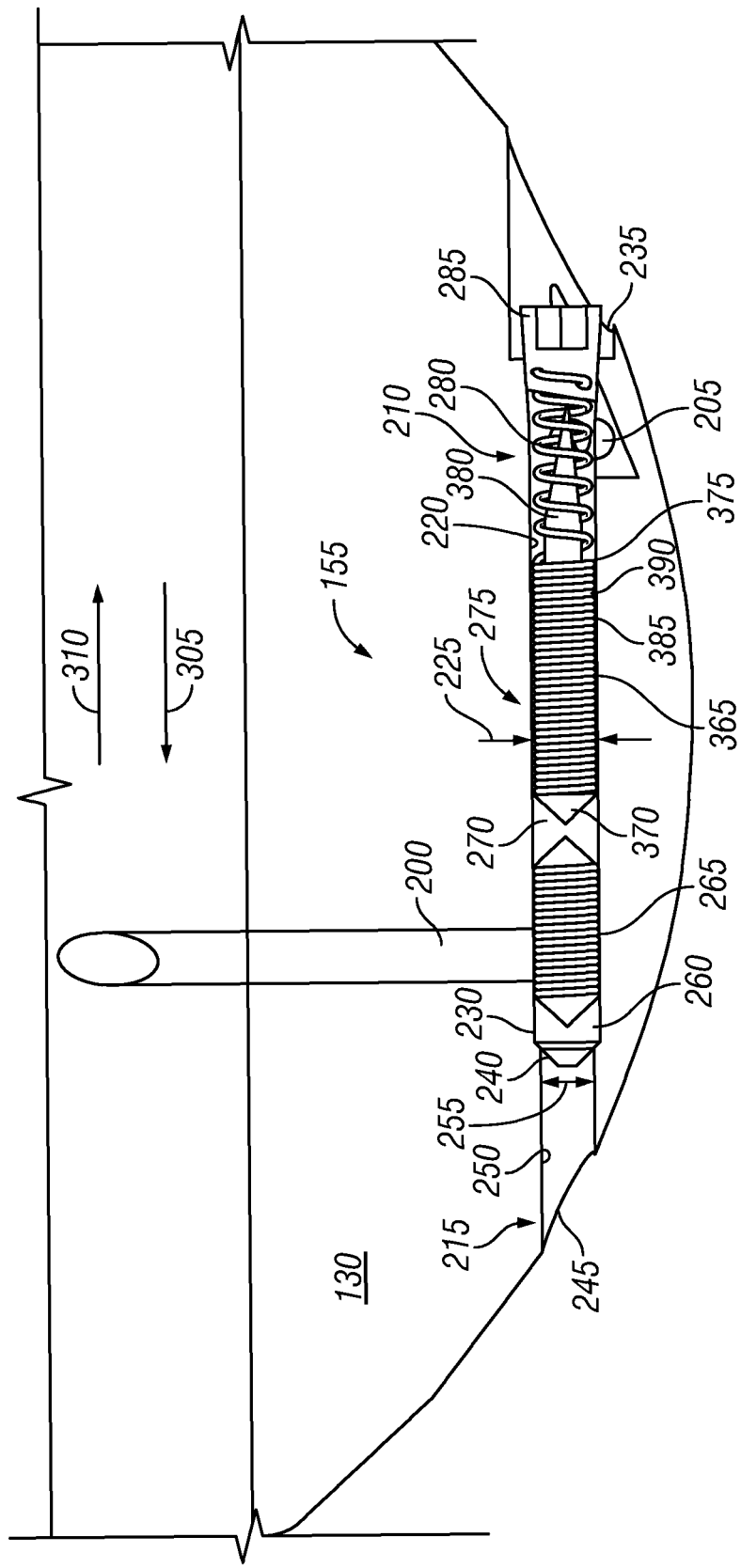
FIG. 3 is a cross-sectional view of the valve body of FIG. 2, exposing the cavity pressure relief system of the valve.

Turning now to FIGS. 2A and 2B, cavity pressure relief system 155 further includes a spool port 210 and a cavity pressure port 215. Spool port 210 is in fluid communication with each of upstream and downstream pressure ports 165, 170. Thus, fluid entering either port 165, 170 also flows into spool port 210. Referring next to FIG. 3, spool port 210 has two ends 230, 235 and is bounded by a surface 220 of ball 130.

Surface 220 is defined by a diameter 225. Cavity pressure port 215 has two ends 240, 245 and is bounded by a surface 250 of ball 130 that is defined by a diameter 255. End 240 of cavity pressure port 215 is connected with end 230 of spool port 210, while end 245 is in fluid communication with cavity 185 (FIG. 1).

Most conventional valves have a pressure rating. Moreover, each is designed such that it does not fail at pressures in excess of that rating up to a certain point. For example, some valves are designed such that they do not fail under pressure as high as 1.5 times their pressure rating. For those valves having cavity relief capability, each is also designed to relieve when pressure within its cavity exceeds its pressure rating. For example, some valves are designed such they relieve when their cavity pressure reaches 1.3 times their pressure rating.

In some embodiments of valve 100, diameters 225, 255 are selected to enable the relief of pressure from cavity 185, as will be described, when the pressure within cavity 185 reaches a pre-selected level. For example, diameters 225, 255 may be selected such that the product of the pressure within cavity 185 and the cross-sectional area of cavity pressure port 215, a function of diameter 225, exceeds the sum of the force exerted by a biasing member 280, described below, and the product of pressure within spool port 210 and the cross-sectional area of spool port 210, a function of diameter 255, when the pressure within cavity 185 reaches the pre-selected level. Further, in some embodiments, the pre-selected level at which valve 100 relieves cavity pressure is 1.3 times the pressure rating of valve 100. As is well known in the art, the pressure rating of a valve may be determined in accordance with standards defined within the American Petroleum Institute (API) Code, or other equivalent standards.

Figure 4:
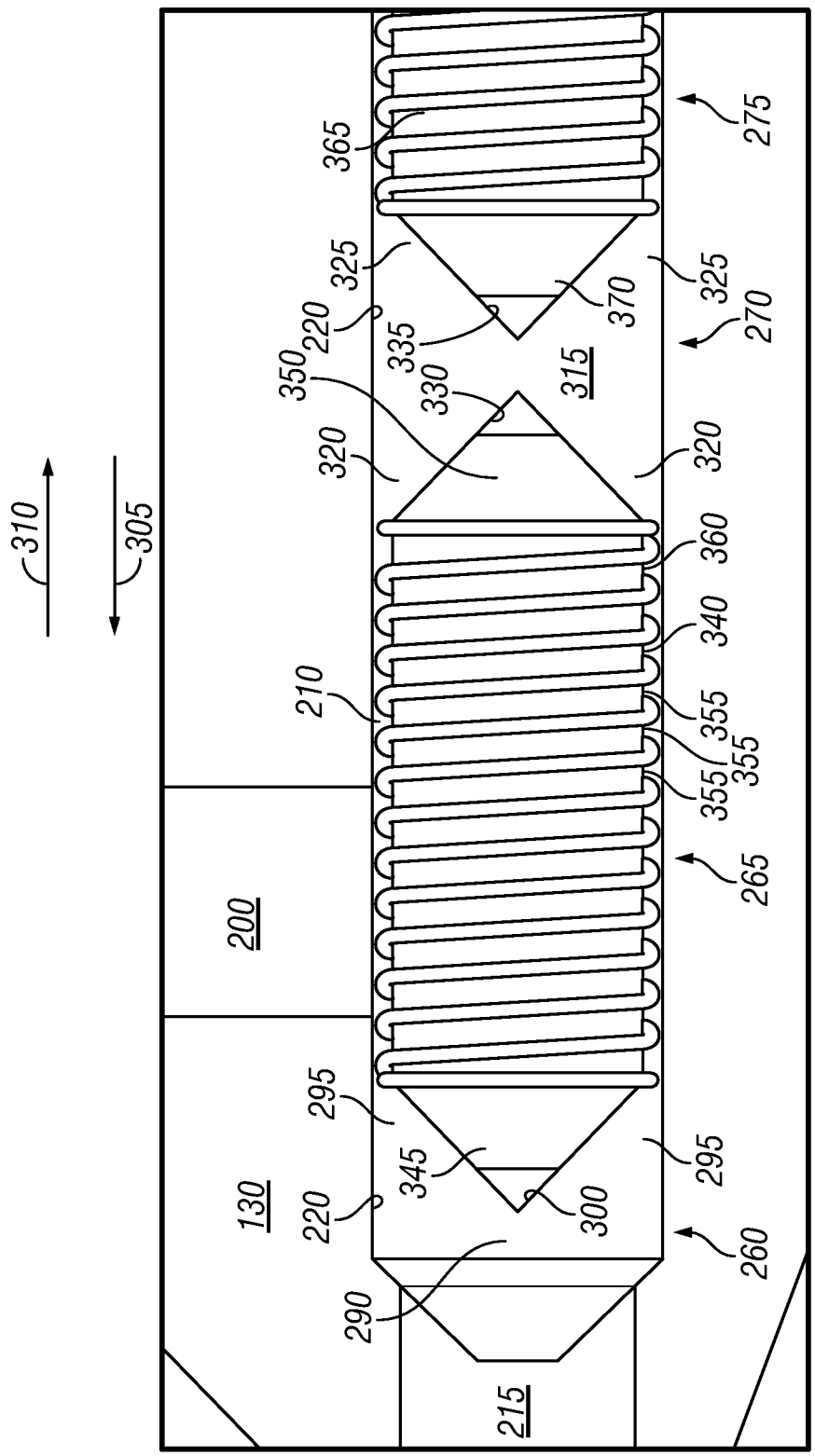
FIG. 4 is an enlarged cross-sectional view of the cavity port seal and the isolation seal of the cavity pressure relief system of FIG. 3.

Moving from left to right in FIG. 3, cavity pressure relief system 155 further includes a cavity port seal 260, an upstream balance spool 265, an isolation seal 270, a downstream balance spool 275, a biasing member 280, and a port closure member 285 disposed within spool port 210. As best viewed in FIG. 4, cavity port seal 260 includes a circular body 290 with two wings 295 extending therefrom. Wings 295 form a cup-like surface 300 therebetween. Seal 260 is formed of a flexible material, such as but not limited to a plastic, such as chlorotrifluoroethylene, including Kel-F®, or polytetrafluoroethylene, better known as Teflon®. When sufficient force is applied to wings 295 in a direction 305, wings 295 flex relative to body 290, or extend radially outward, into sealing engagement with surface 220 of ball 130. When wings 295 are actuated, meaning extended radially into sealing engagement with surface 220, seal 260 isolates cavity pressure port 215 from upstream pressure port 200. Further, seal 260 is axially displaceable within spool port 210 in direction 305 or the opposite direction 310 under sufficient force.

Isolation seal 270 also includes a flexible material, such as but not limited to a plastic, such as chlorotrifluoroethylene, including Kel-F®, or polytetrafluoroethylene, better known as Teflon®, and is similar in shape to two cavity port seals 260 positioned back-to-back. Isolation seal 270 includes a circular body 315 with two wings 320 extending therefrom in direction 305 and two wings 325 extending therefrom in direction 310. Wings 320 form a cup-like surface 330 therebetween and, wings 325 form a cup-like surface 335 therebetween. When sufficient force is applied to wings 320 in direction 310, wings 320 flex relative to body 315, or extend radially outward, into sealing engagement with surface 220 of ball 130. When wings 320 are actuated, meaning extended radially into sealing engagement with surface 220, seal 270 isolates upstream pressure port 200 from downstream pressure port 205 (FIG. 3). Similarly, when sufficient force is applied to wings 325 in direction 305, wings 325 flex relative to body 315, or extend radially outward, into sealing engagement with surface 220 of ball 130. When wings 325 are actuated, meaning extended radially into sealing engagement with surface 220, seal 270 isolates downstream pressure port 205 from upstream pressure port 200. In this manner, wings 320, 325 provide redundant means for isolating upstream pressure port 200 from downstream pressure port 205, and prevent through leakage, or bleeding, through valve 100, regardless of flow direction within pipe sections 105, 110 (FIG. 1). Like cavity port seal 260, isolation seal 270 is also axially displaceable within spool port 210 in either direction 305, 310 under sufficient force.

Upstream balance spool 265 includes a cylindrical body 340 having two ends 345, 350 shaped to be received within cup 300 of cavity port seal 260 and cup 330 of isolation seal 270, respectively. In this embodiment, ends 345, 350 are substantially convex. Body 340 further includes a plurality of grooves 355 formed over its outer surface 360. Grooves 355 enable fluid entering spool port 210 from upstream pressure port 200 to surround and pass beyond upstream balance spool 265 to actuate seals 260, 270, as described above. Upstream balance spool 265 is axially displaceable within spool port 210 in either direction 305, 310 under sufficient force.

Returning to FIG. 3, downstream balance spool 275 includes a cylindrical body 365 having two opposing ends 370, 375. End 370 is shaped to be received within cup 335 of isolation seal 270, and in this embodiment, is substantially convex. At end 375, downstream balance spool 275 further includes a reduced-diameter extension 380, as compared to the diameter of body 365. Body 365 further includes a plurality of grooves 385 formed over its outer surface 390. Grooves 385 enable fluid entering spool port 210 from downstream pressure port 205 to surround and pass beyond downstream balance spool 275 to actuate isolation seal 270, as described above. Downstream balance spool 275 is axially displaceable within spool port 210 in either direction 305, 310 under sufficient force.

Port closure member 285 is inserted into spool port 210 proximate end 235. Port closure member 285 sealingly engages surface 220 of ball 130 to prevent the loss fluid from spool port 210 at this interface. Biasing member 280 is concentrically disposed about extension 380 of downstream balance spool 275 in compression between end 375 of downstream balance spool 275 and port closure member 285. Biasing member 280 maintains downstream balance spool 275 in engagement with isolation seal 270 with sufficient force to cause end 370 of downstream balance spool 275 to actuate wings 325 of isolation seal 270 when downstream pressure port 205 is unpressurized, meaning contains little to no fluid pressure. In some embodiments, biasing member 280 is a spring.

During operation, valve 100 is actuated to enable or prevent fluid flow from upstream pipe section 105 to downstream pipe section 110. Each time valve 100 is actuated from its open position to its closed position, fluid becomes entrapped within cavity 185. Also, fluid from upstream pipe section 105 pressurizes upstream pressure port 200 and flows into spool port 210. Upon entering spool port 210, the fluid surrounds upstream balance spool 265 via grooves 355 and passes beyond spool 265 to actuate wings 295 of cavity port seal 260, thereby isolating cavity pressure port 215 from upstream pressure port 200, and to actuate wings 320 of isolation seal 270, thereby isolating upstream pressure port 200 from downstream pressure port 205.

At the same time, the pressure of fluid within downstream pressure port 205 is comparatively low because port 205, being coupled with flowbore 120 of downstream pipe section 110, is unpressurized. Despite a low pressure in port 205, biasing member 280 maintains downstream balance spool 275 in engagement with isolation seal 270 such that wings 325 of seal 270 are actuated by end 370 of spool 275, thereby providing a redundant means for isolating downstream pressure port 205 from upstream pressure port 200.

Over time, the pressure of entrapped fluid within cavity 185 may rise due to temperature changes. When the pressure of fluid within cavity 185 exerts force on cavity port seal 260 exceeding the force exerted on cavity port seal 260 by fluid within spool port 210 and biasing member 280, cavity port seal 260, upstream balance spool 265, isolation seal 270, and downstream balance spool 275 displace axially within spool port 210 in direction 310, compressing biasing member 280, until a fluid path is established between cavity pressure port 215 and upstream pressure port 200. Once the fluid path is established, pressure is relieved from cavity 185 through cavity pressure port 215 into upstream pressure port 200.

When the pressure of fluid within cavity 185 and thus cavity pressure port 215 is reduced to a point wherein the force exerted on cavity port seal 260 by fluid within spool port 210 exceeds the force exerted on cavity port seal 260 by fluid within cavity pressure port 215 and biasing member 280, biasing member 280 expands and cavity port seal 260, upstream balance spool 265, isolation seal 270, and downstream balance spool 275 are displaced axially within spool port 210 in direction 305 to close the fluid path and again isolate cavity pressure port 215 from upstream pressure port 200. Pressure buildup within cavity 185 may be repeatedly relieved in this manner by cavity pressure relief system 155 as valve 100 continues to operate and fluid continues to flow from upstream pipe section 105 through valve 100 into downstream pipe section 110.

As previously described, valve 100 is bi-directional. Thus, fluid may flow through valve 100 in the opposite direction, meaning from pipe section 110 through valve 100 into pipe section 105. Under such conditions, cavity pressure relief system 155 remains operable to relieve pressure from cavity 185.

During operation, valve 100 is actuated to enable or prevent fluid flow from pipe section 110 to pipe section 105. Each time valve 100 is actuated from its open position to its closed position, fluid becomes entrapped within cavity 185. Also, fluid from pipe section 110 pressurizes pressure port 205 and flows into spool port 210. Upon entering spool port 210, the fluid surrounds balance spool 275 via grooves 355 and passes beyond spool 275 to actuate wings 325 of isolation seal 270, thereby isolating pressure port 205 from pressure port 200.

The fluid also displaces balance spool 275, isolation seal 270, balance spool 265, and cavity port seal 260 in direction 305 until cavity port seal 260 sealingly engages cavity pressure port 215. Contact between end 350 of balance spool 265 and wings 320 of isolation valve 270 and between end 345 of spool 265 and wings 295 of cavity port seal 260 cause actuation of wings 320, thereby providing a redundant means for isolating pressure port 200 from pressure port 205, actuation of wings 295, thereby isolating cavity pressure port 215 from pressure port 200, respectively.

Over time, the pressure of fluid within cavity 185 may rise due to temperature changes. When the pressure of fluid within cavity 185 exerts force on cavity port seal 260 exceeding the force exerted on cavity port seal 260 by fluid within spool port 210 and biasing member 280, cavity port seal 260, upstream balance spool 265, isolation seal 270, and downstream balance spool 275 displace axially within spool port 210 in direction 310 until a fluid path is established between cavity pressure port 215 and pressure port 200. Once the fluid path is established, pressure is relieved from cavity 185 through cavity pressure port 215 into pressure port 200.

When the pressure of fluid within cavity 185 and thus cavity pressure port 215 is reduced to a point wherein the force exerted on cavity port seal 260 by fluid within spool port 210 and biasing member 280 exceeds the force exerted on cavity port seal 260 by fluid within cavity pressure port 215, biasing member 280 expands and cavity port seal 260, upstream balance spool 265, isolation seal 270, and downstream balance spool 275 are displaced axially within spool port 210 in direction 305 to close the fluid path and again isolate cavity pressure port 215 from pressure port 200. Pressure buildup within cavity 185 may be repeatedly relieved in this manner by cavity pressure relief system 155 as valve 100 continues to operate and fluid continues to flow from pipe section 110 through valve 100 into pipe section 105.

In the above-described embodiment, cavity pressure relief system 155 is integral with ball 130, meaning disposed entirely within the wall 192 of ball 130 between its inner and outer surfaces 190, 195. In other embodiments, the cavity pressure relief system may be disposed external to ball 130. One such embodiment is shown in FIGS. 5A and 5B.

Figure 5B:
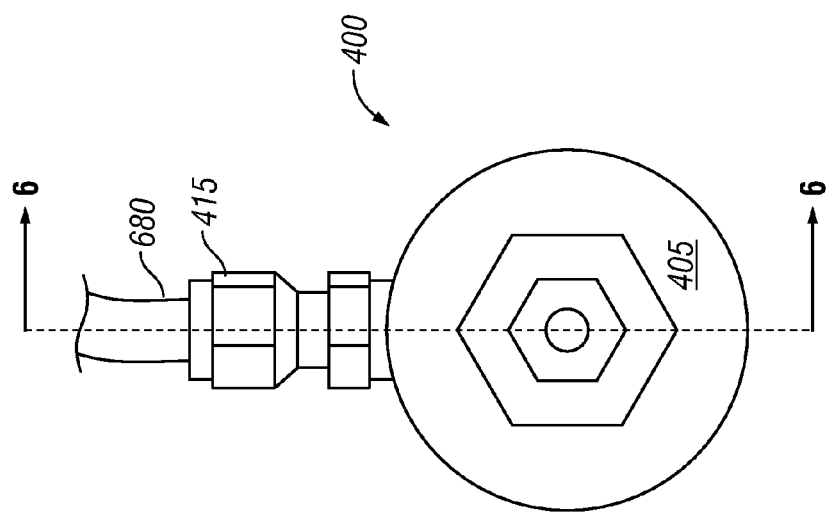
FIGS. 5A and 5B are perspective side and end views, respectively, of another embodiment of a cavity pressure relief system in accordance with the principles disclosed herein.
Figure 5A:
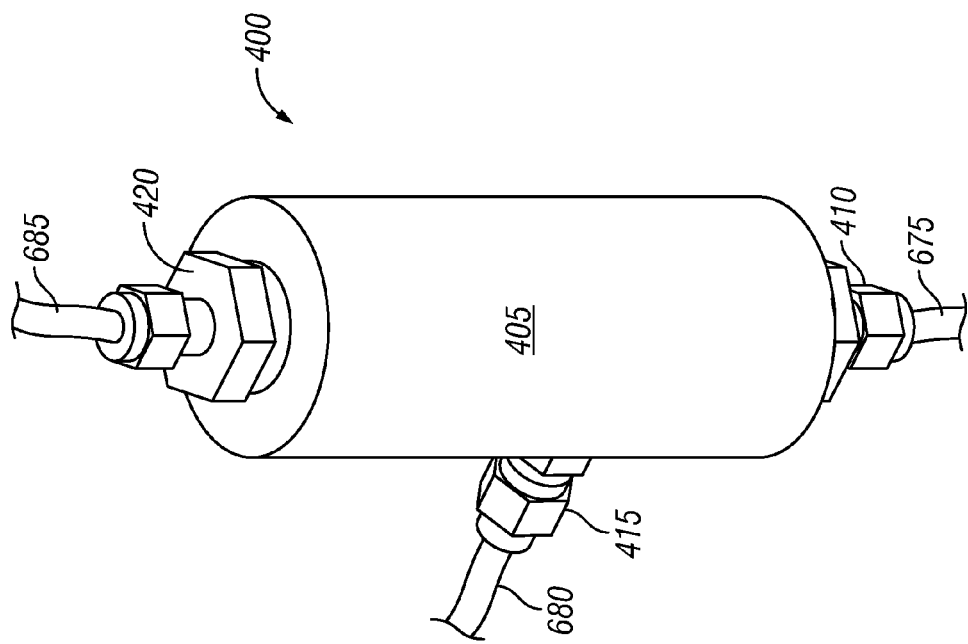

Referring to FIGS. 5A and 5B, cavity pressure relief system 400 includes a body 405, a cavity pressure housing 410, a side pressure housing 415, and an end pressure housing 420. In this embodiment, body 405 is cylindrical in shape. Cavity pressure housing 410 is in fluid communication with cavity 185 (FIG. 1) when valve 100 (FIG. 1) is closed via a jumper, hose, or other equivalent flowline 675. Side pressure housing 415 is in fluid communication with upstream pipe section 105 (FIG. 1) via a jumper, hose, or other equivalent flowline 680. End pressure housing 420 is in fluid communication with downstream pipe section 110 (FIG. 1) via a jumper, hose, or other equivalent flowline 685. To enable the coupling of hoses 675, 680, 685 to valve 100 in this manner, ball 130, upstream pipe section 105, and/or downstream pipe section 110 may include one or more bores (not shown) to enable passage of hoses 675, 680, 685 therethrough.

Figure 6:
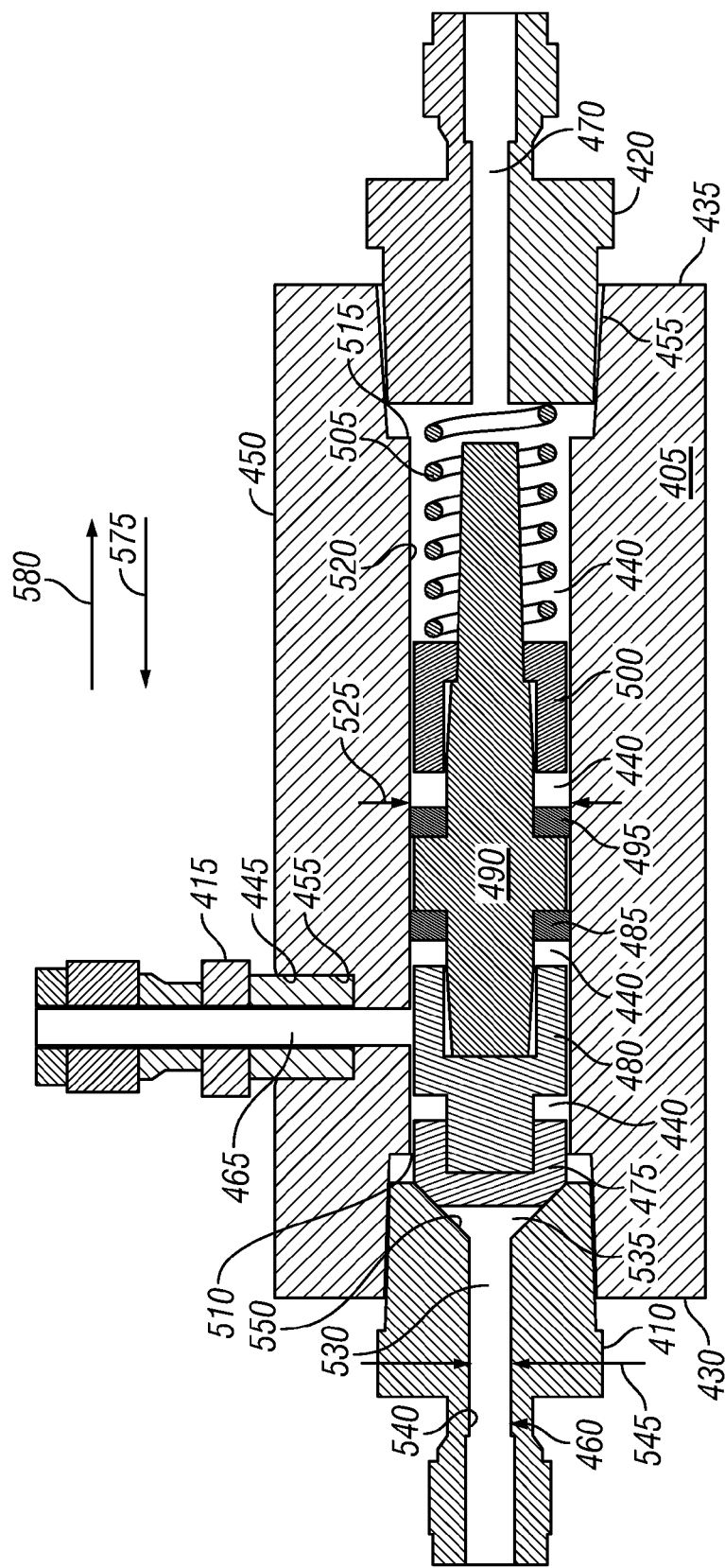
FIG. 6 is a cross-sectional, lengthwise view of the cavity pressure relief system of FIGS. 5A and 5B.

Turning to FIG. 6, a cross-sectional view of cavity pressure relief system 400, corresponding to Section A-A identified in FIG. 5B, is shown. As shown, body 405 has two opposing ends 430, 435, a through passage 440 extending therebetween, and a bore 445 extending from an outer surface 450 of body 405 to through passage 440. Cavity pressure housing 410 is sealingly coupled to body 405 at end 430, and end pressure housing 420 is sealingly coupled to body 405 at end 435. Side pressure housing 415 is inserted into bore 445 and sealingly coupled to body 405 at that location. In this embodiment, cavity pressure housing 410, end pressure housing 420, and side pressure housing 415 couple with body 405 via threaded connections 455.

Cavity pressure housing 410 includes a cavity pressure port 460 in fluid communication between cavity 185 (FIG. 1) via hose 675 (FIG. 5A) and through passage 440. Side pressure housing 415 includes a side pressure port 465 in fluid communication with flowbore 115 (FIG. 1) of upstream pipe section 105 via hose 680 (FIG. 5A), and end pressure housing 420 includes an end pressure port 470 in fluid communication with flowbore 120 (FIG. 1) of downstream pipe section 110 via hose 685 (FIG. 5A). Each of ports 465, 470 is also in fluid communication with through passage 440.

Cavity pressure relief system 400 further includes, moving from left to right in FIG. 6, a cavity port seal 475, an upstream balance spool 480, an upstream isolation seal 485, a downstream balance spool 490, a downstream isolation seal 495, a collar 500, and a biasing member 505 disposed within through passage 440 between cavity and end pressure housings 410, 420. The portion of through passage 440 between housings 410, 420 functions similarly to spool port 210 of cavity pressure relief system 155 previously described. Consequently, this portion of through passage 440 will be referred to henceforth as spool port 440.

As previously described, spool port 440 is in fluid communication with side and end pressure ports 465, 470. Thus, fluid entering either port 465, 470 also flows into spool port 440. Spool port 440 has two ends 510, 515 and is bounded by a surface 520 of body 405. Surface 520 is defined by a diameter 525.

Cavity pressure port 460 includes two portions, a linear portion 530 and a tapered portion 535 extending therefrom. Linear portion 530 is bounded by a surface 540 of cavity pressure housing 410. Surface 540 is defined by a constant diameter 545. Tapered portion 535 is bounded by a surface 550 of cavity pressure housing 410. Tapered portion 535 of cavity pressure port 460 is in fluid communication with end 510 of spool port 440, while linear portion 530 is in fluid communication with cavity 185 (FIG. 1). In some embodiments of valve 100, diameter 525 of spool port 440 and diameter 545 of cavity pressure port 460 are selected to enable the relief of pressure from cavity 185, as will be described, when the pressure within cavity 185 reaches a pre-selected level. For example, diameters 525, 545 may be selected such that the product of the pressure within cavity 185 and the cross-sectional area of linear portion 530 of cavity pressure port 460, a function of diameter 545, exceeds the sum of the force exerted by biasing member 505 and the product of pressure within spool port 440 and the cross-sectional area of spool port 440, a function of diameter 525, when the pressure within cavity 185 reaches the pre-selected level. Further, in some embodiments, the pre-selected level at which valve 100 relieves cavity pressure is 1.3 times the pressure rating of valve 100.

Figure 7:
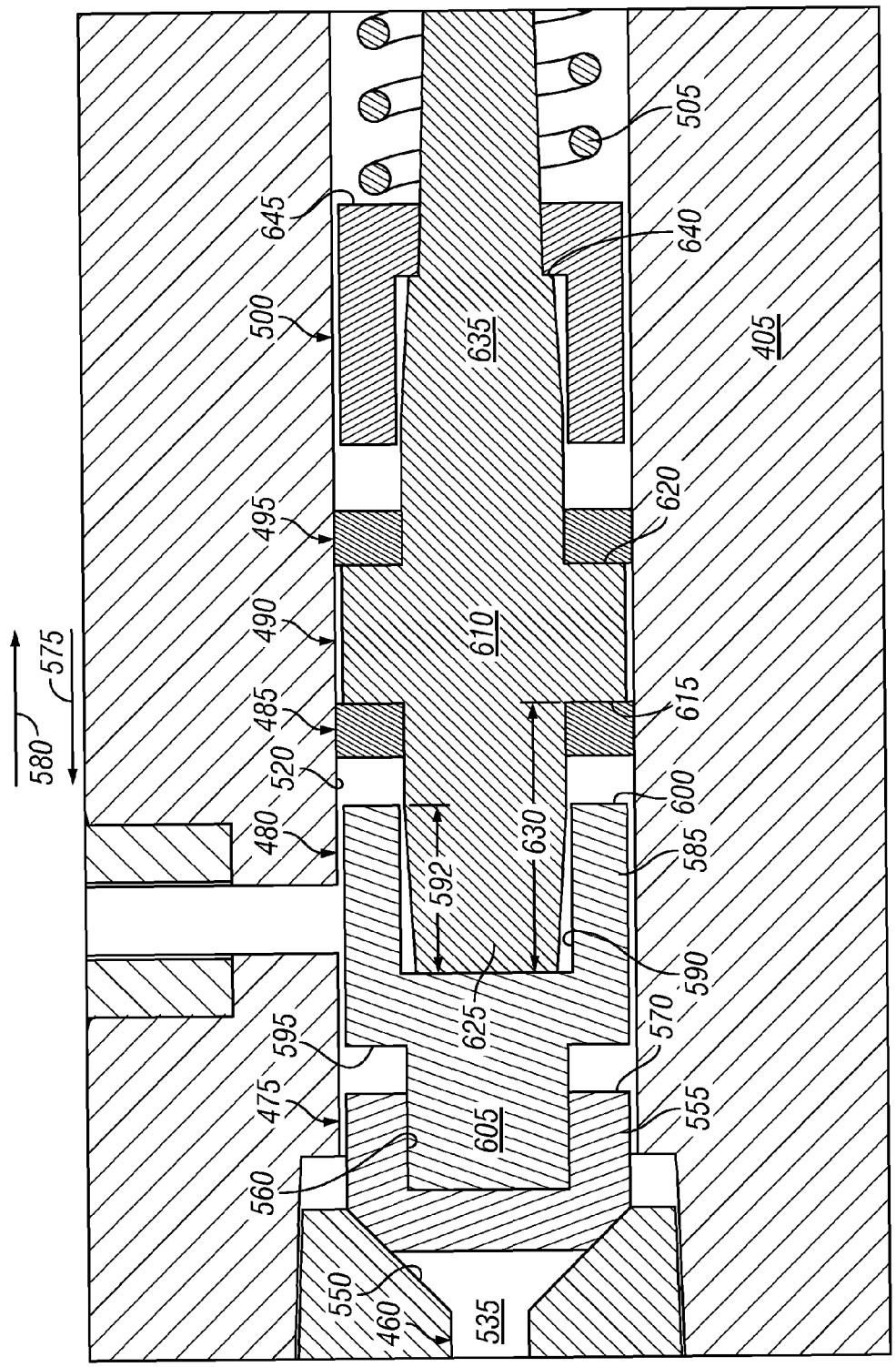
FIG. 7 is an enlarged view of the cavity port seal, upstream and downstream balance spools, and collar of the cavity pressure relief system of FIG. 6.

As best viewed in FIG. 7, cavity port seal 475 includes a tubular member 555 surrounding a bore 560 and extending between a closed end 565 and an open end 570. Further, cavity port seal 475 is axially displaceable within spool port 440 toward cavity pressure port 460 in a direction 575 or the opposite direction 580 under sufficient force. Closed 565 end is configured to be received within tapered portion 535 of cavity pressure port 460 of cavity pressure housing 410 such that closed end 565 sealingly engages surface 550 of cavity pressure housing 410. When closed end 565 of cavity port seal 475 sealingly engages cavity pressure housing 410, cavity pressure port 460 is isolated from side pressure port 465 (FIG. 6).

Upstream balance spool 480 includes a tubular portion 585 surrounding a bore 590 and extending between a closed end 595 and an open end 600. Bore 590 has a length 592. At closed end 595, spool 480 further includes an extension portion 605 received within bore 560 of cavity port seal 475. Upstream balance spool 480 is axially displaceable within spool port 440 in either direction 575, 580 under sufficient force.

Downstream balance spool 490 includes a cylindrical body 610 having two opposing ends 615, 620. At end 615, spool 490 further includes an extension 625 received within bore 590 of upstream balance spool 480. Extension 625 has a length 630 exceeding length 592 of bore 590. Thus, when cavity pressure relief system 400 is assembled as shown and operable, upstream isolation seal 485 is not compressed between upstream and downstream balance spools 480, 490. At end 620, spool 490 further includes an extension 635 with a shoulder 640 extending circumferentially thereabout. Downstream balance spool 490 is axially displaceable within spool port 440 in either direction 575, 580 under sufficient force.

Collar 500 is a tubular member disposed about extension 635 of downstream balance spool 490 in abutment with shoulder 640 of extension 635. When cavity pressure relief system 400 is assembled as shown and operable, shoulder 640 prevents compression of downstream isolation seal 495 between collar 500 and downstream balance spool 490. Collar 500 includes a radially extending surface 645.

Referring again to FIG. 6, biasing member 505 is concentrically disposed about extension 635 of downstream balance spool 490 in compression between collar 500 and end pressure housing 420. Thus, surface 645 of collar 500 provides a surface against which biasing member 505 reacts. Biasing member 505 exerts sufficient force against a stacked assembly consisting of collar 500, downstream balance spool 490, upstream balance spool 480, and cavity port seal 475 to cause cavity port seal 475 to remain in sealing engagement with cavity pressure housing 410, thereby isolating cavity pressure port 460 from side pressure port 465, when end pressure port 470 is unpressurized. In some embodiments, biasing member 505 is a spring.

Upstream and downstream isolation seals 485, 495 are disposed concentrically about extensions 625, 635, respectively, of downstream balance spool 490 in abutment with body 610 of spool 490. Each of seals 485, 495 sealingly engages spool 490 and surface 520 of body 405. Thus, seals 485, 495 provide redundant means for isolating side pressure port 465 from end pressure port 470.

Figure 8:
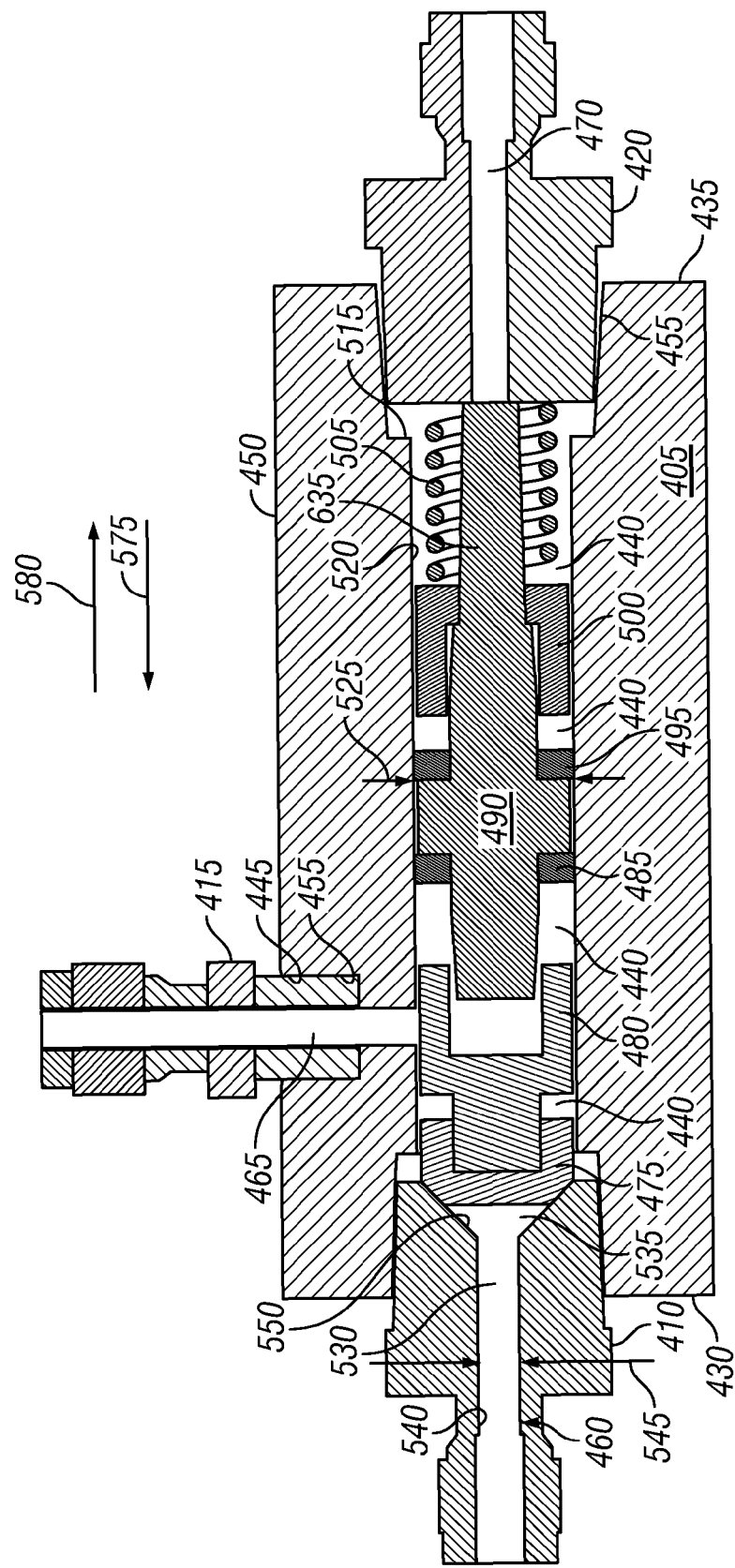
FIG. 8 is a cross-sectional, lengthwise view of the cavity pressure relief system of FIGS. 5A and 5B, wherein the side pressure port is pressurized and the end pressure port is not.

During operation, valve 100 is actuated to enable or prevent fluid flow from upstream pipe section 105 to downstream pipe section 110. Each time valve 100 is actuated from its open position to its closed position, fluid becomes entrapped within cavity 185. Also, referring still to FIG. 6, fluid from upstream pipe section 105 pressurizes side pressure port 465 and flows into spool port 440. Upon entering spool port 440, the fluid axially displaces downstream balance spool 490 with seals 465, 470 disposed thereabout and collar 500 against biasing member 505 to seat extension 635 of spool 490 over end pressure port 470, thereby closing port 470, as shown in FIG. 8. The fluid also maintains upstream balance spool 480 in engagement with cavity pressure seal 475, and cavity pressure seal 475, in turn, in sealing engagement with cavity pressure housing 410. Thus, cavity pressure port 460 remains closed despite compression of biasing member 505.

Figure 9:
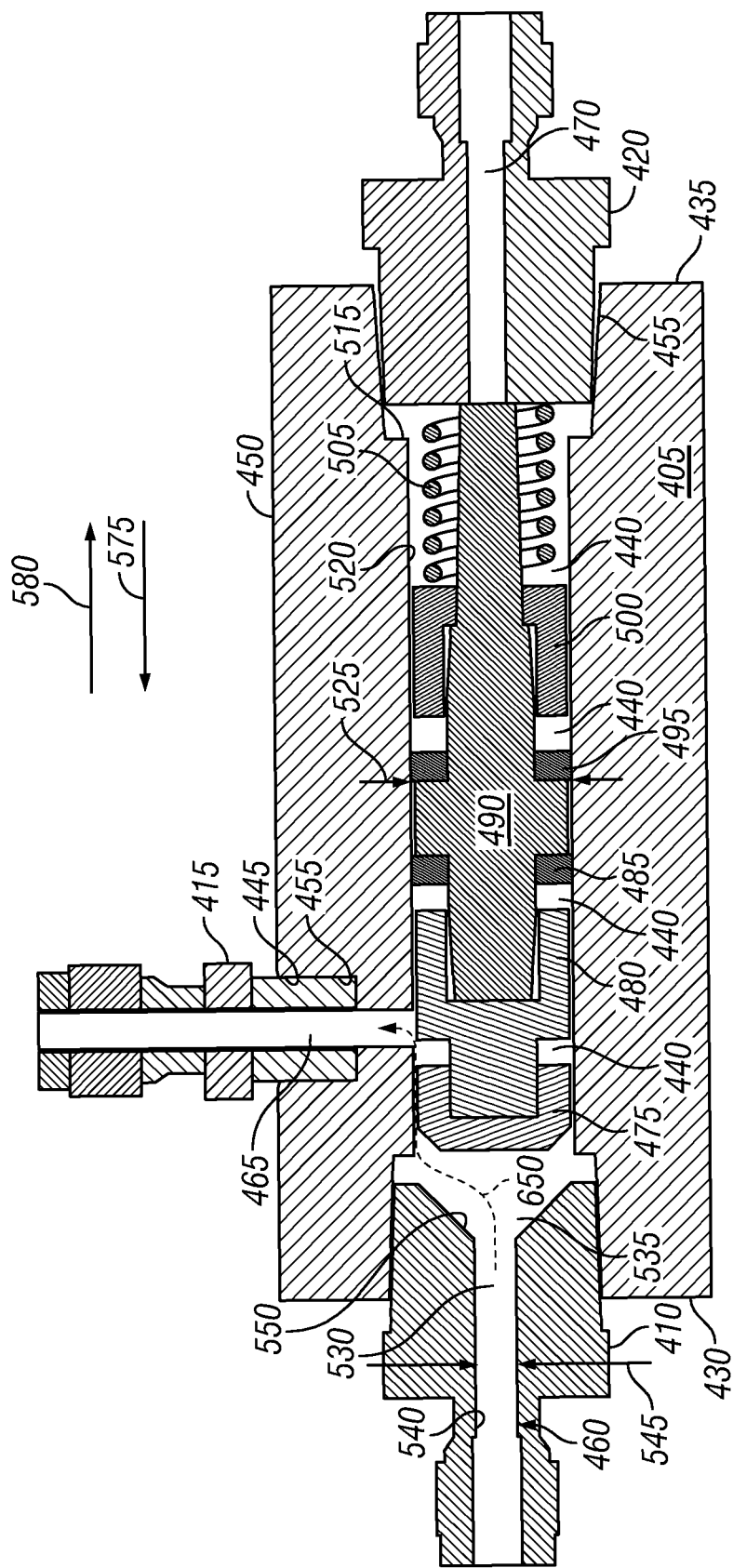
FIG. 9 a cross-sectional, lengthwise view of the cavity pressure relief system of FIGS. 5A and 5B, wherein the cavity pressure port is unsealed to relieve pressure.

Over time, the pressure of entrapped fluid within cavity 185 may rise due to temperature changes. When the pressure of fluid within cavity 185 and thus cavity pressure port 460 exerts force on cavity port seal 475 exceeding the force exerted on upstream balance spool 480 by fluid within spool port 440, cavity port seal 475 and upstream balance spool 480 displace axially within spool port 440 in direction 580 until a fluid path 650 is established between cavity pressure port 460 and side pressure port 465, as shown in FIG. 9. Once fluid path 650 is established, pressure is relieved from cavity 185 through cavity pressure port 460 into side pressure port 465.

When the pressure of fluid within cavity 185 and thus cavity pressure port 460 is reduced to a point wherein the force exerted on upstream balance spool 480 by fluid within spool port 440 exceeds the force exerted on cavity port seal 475 by fluid within cavity pressure port 460, cavity port seal 475 and upstream balance spool 480 again displace axially within spool port 440 but in direction 575 to close fluid path 650 and again isolate cavity pressure port 460 from side pressure port 465, as shown in FIG. 8. Pressure buildup within cavity 185 may be repeatedly relieved in this manner by cavity pressure relief system 400 as valve 100 continues to operate and fluid continues to flow from upstream pipe section 105 through valve 100 into downstream pipe section 110.

As previously described, valve 100 is bi-directional. Thus, fluid may flow through valve 100 in the opposite direction, meaning from "downstream" pipe section 110 through valve 100 into "upstream" pipe section 105. Under such conditions, cavity pressure relief system 400 remains operable to relieve pressure from cavity 185.

During operation, valve 100 is actuated to enable or prevent fluid flow from pipe section 110 to pipe section 105. Each time valve 100 is actuated from its open position to its closed position, fluid becomes entrapped within cavity 185. Also, fluid from pipe section 110 pressurizes end pressure port 470 and flows into spool port 440, where the fluid exerts force over surface 645 of collar 500 in direction 575. FIG. 6 illustrates the configuration of valve 440 wherein end pressure port 470 is pressurized.

Over time, the pressure of fluid within cavity 185 may rise due to temperature changes. When the pressure of fluid within cavity 185 exerts force on cavity port seal 475 exceeding the force exerted on collar 500 by fluid within spool port 440 and biasing member 505, cavity port seal 475, upstream balance spool 480, downstream balance spool 485 with seals 485, 495 disposed thereabout, and collar 500 displace axially within spool port 440 in direction 580, compressing biasing member 505, until fluid path 650 is established between cavity pressure port 460 and side pressure port 465, as shown in FIG. 9. Once fluid path 650 is established, pressure is relieved from cavity 185 through cavity pressure port 460 into side pressure port 465.

When the pressure of fluid within cavity 185 and thus cavity pressure port 460 is reduced to a point wherein the force exerted on collar 500 by fluid within spool port 440 and biasing member 505 exceeds the force exerted on cavity port seal 475 by fluid within cavity pressure port 460, biasing member 505 expands and cavity port seal 475, upstream balance spool 480, downstream balance spool 485 with seals 485, 495 disposed thereabout, and collar 500 are displaced axially within spool port 440 in direction 575 to close fluid path 650 and again isolate cavity pressure port 460 from side pressure port 465, as shown in FIG. 6. Pressure buildup within cavity 185 may be repeatedly relieved in this manner by cavity pressure relief system 400 as valve 100 continues to operate and fluid continues to flow from pipe section 110 through valve 100 into pipe section 105.

While various embodiments have been shown and described, modifications thereof can be made by one skilled in the art without departing from the spirit and teachings herein. The embodiments herein are exemplary only, and are not limiting. Many variations and modifications of the apparatus disclosed herein are possible and within the scope of the invention. For example, although the embodiments of a cavity pressure relief system described above are presented in the context of a bi-directional valve, the cavity pressure relief system is equally applicable to uni-directional valves as well. Moreover, the valve described herein is a ball valve. A cavity pressure relief system in accordance with the principles disclosed herein may also be applied to other types of valves which are actuatable between open and closed configurations. Accordingly, the scope of protection is not limited by the description set out above, but is only limited by the claims which follow, that scope including all equivalents of the subject matter of the claims.

What is claimed is:

1. A valve coupled between a first pipe section and a second pipe section and actuatable between an open configuration, wherein fluid flow is enabled between the first and second pipe sections, and a closed configuration, wherein fluid flow between the first and second pipe sections is prevented and fluid is entrapped within an enclosed cavity inside the valve, the valve comprising:
   a first pressure port in fluid communication with the first pipe section when the valve is closed;
   a second pressure port in fluid communication with the enclosed cavity when the valve is closed;
   a first seal isolating the second pressure port from the first pressure port when fluid pressure within the enclosed cavity is less than a pre-selected value and displaceable to enable fluid communication between the second pressure port and the first pressure port when fluid pressure in the enclosed cavity is equal to or greater than the pre-selected value;
   a spool port extending at least between the first pressure port and the second pressure port and wherein the first seal is disposed within the spool port; and
   a third pressure port in fluid communication with the second pipe section when the valve is closed and a second seal disposed in the spool port isolating the first pressure port from the third pressure port.

2. The valve of claim 1, further comprising a balance spool operable to actuate the second seal into sealing engagement with a valve surface bounding the spool port, whereby the first pressure port is isolated from the third pressure port.

3. The valve of claim 1, further comprising a biasing member urging the first seal toward the second pressure port.

4. The valve of claim 1, further comprising a balance spool operable to actuate the first and the second seals into sealing engagement with a valve surface bounding the spool port.

5. The valve of claim 1, wherein the spool port is bounded by a surface having a first diameter and the second pressure port is bounded by a surface having a second diameter, wherein the first diameter and the second diameter are a function of the pre-selected value.

6. The valve of claim 5, wherein the pre-selected value is a function of a pressure rating of the valve.

7. The valve of claim 1, further comprising:
   a valve body having a through passage coupled between the first and the second pipe sections; and
   a closure member actuatable to enable fluid flow through the through passage and to prevent fluid flow through the through passage, the closure member having a wall bounded by an inner surface and an outer surface;
   wherein the first pressure port, the second pressure port, and the first seal are disposed within the wall of the closure member.

8. A valve coupled between a first pipe section and a second pipe section, the valve comprising:
   a body having a through passage;
   a ball disposed within the through passage and having a bore, the ball rotatable between an open position, wherein the bore aligns with the through passage, and a closed position, wherein the bore is substantially normal to the through passage and forms an enclosed cavity;
   a first pressure port extending through the ball, the first pressure port in fluid communication with the first pipe section when the ball is in the closed position;
   a second pressure port extending through the valve, the second pressure port in fluid communication with the enclosed cavity when the ball is in the closed position;
   a first seal disposed between the first pressure port and the second pressure port, the first seal isolating the second pressure port from the first pressure port when fluid pressure within the enclosed cavity is less than a pre-selected value and displaceable to enable fluid communication between the second pressure port and the first pressure port when fluid pressure in the enclosed cavity is equal or greater than the pre-selected value;

a spool port extending at least between the first pressure port and the second pressure port and wherein the first seal is disposed within the spool port;

a third pressure port in fluid communication with the spool port and with the second pipe section when the ball is in the closed position; and a second seal disposed within the spool port and isolating the first pressure port from the third pressure port.

9. The valve of claim 8, further comprising a balance spool disposed within the spool port and operable to actuate the second seal into sealing engagement with a surface of the body bounding the spool port.

10. The valve of claim 8, further comprising a biasing member disposed within the spool port and urging the first seal toward the second pressure port.

11. The valve of claim 8, further comprising a balance spool operable to actuate the first and the second seals into sealing engagement a surface of the valve body bounding the spool port.

12. The valve of claim 8, wherein the spool port is bounded by a surface having a first diameter and the second pressure port is bounded by a surface having a second diameter, wherein the first diameter and the second diameter are a function of the pre-selected value.

13. The valve of claim 12, wherein the pre-selected value is a function of a pressure rating of the valve.

14. A valve system coupled between a first pipe section and a second pipe section, the valve comprising:

a valve body having a through passage;

a ball disposed within the through passage and having a bore, the ball rotatable between an open position, wherein the bore aligns with the through passage, and a closed position, wherein the bore is substantially normal to the through passage and is enclosed; and a cavity pressure relief system in fluid communication with the valve, the cavity pressure relief system comprising:

a first pressure port in fluid communication with the first pipe section when the ball is in the closed position;

a second pressure port in fluid communication with the enclosed bore when the ball is in the closed position;

a first seal isolating the second pressure port from the first pressure port when fluid pressure within the enclosed bore is less than a pre-selected value and displaceable to enable fluid communication between the bore and the first pipe section when fluid pressure in the enclosed bore is equal or greater than the pre-selected value such as to allow pressure to be relieved from the bore to the first pipe section;

a third pressure port in fluid communication with the second pipe section when the ball is in the closed position; and a second seal isolating the third pressure port from the first pressure port;

a spool port in fluid communication with the first pressure port, the second pressure port, and the third pressure port; and wherein the first seal and the second are disposed within the spool port.

15. The valve system of claim 14, further comprising a third seal disposed within the spool port and isolating the third pressure port from the first pressure port.

16. The valve system of claim 14, further comprising a biasing member disposed within the spool port and biasing the first seal toward the second pressure port.

17. The valve system of claim 14, wherein the spool port is bounded by a surface having a first diameter and the second pressure port is bounded by a surface having a second diameter, wherein the first diameter and the second diameter are a function of the pre-selected value.

18. The valve system of claim 17, wherein the pre-selected value is a function of a pressure rating of the valve.

* * * * *